Patented Dec. 11, 1951

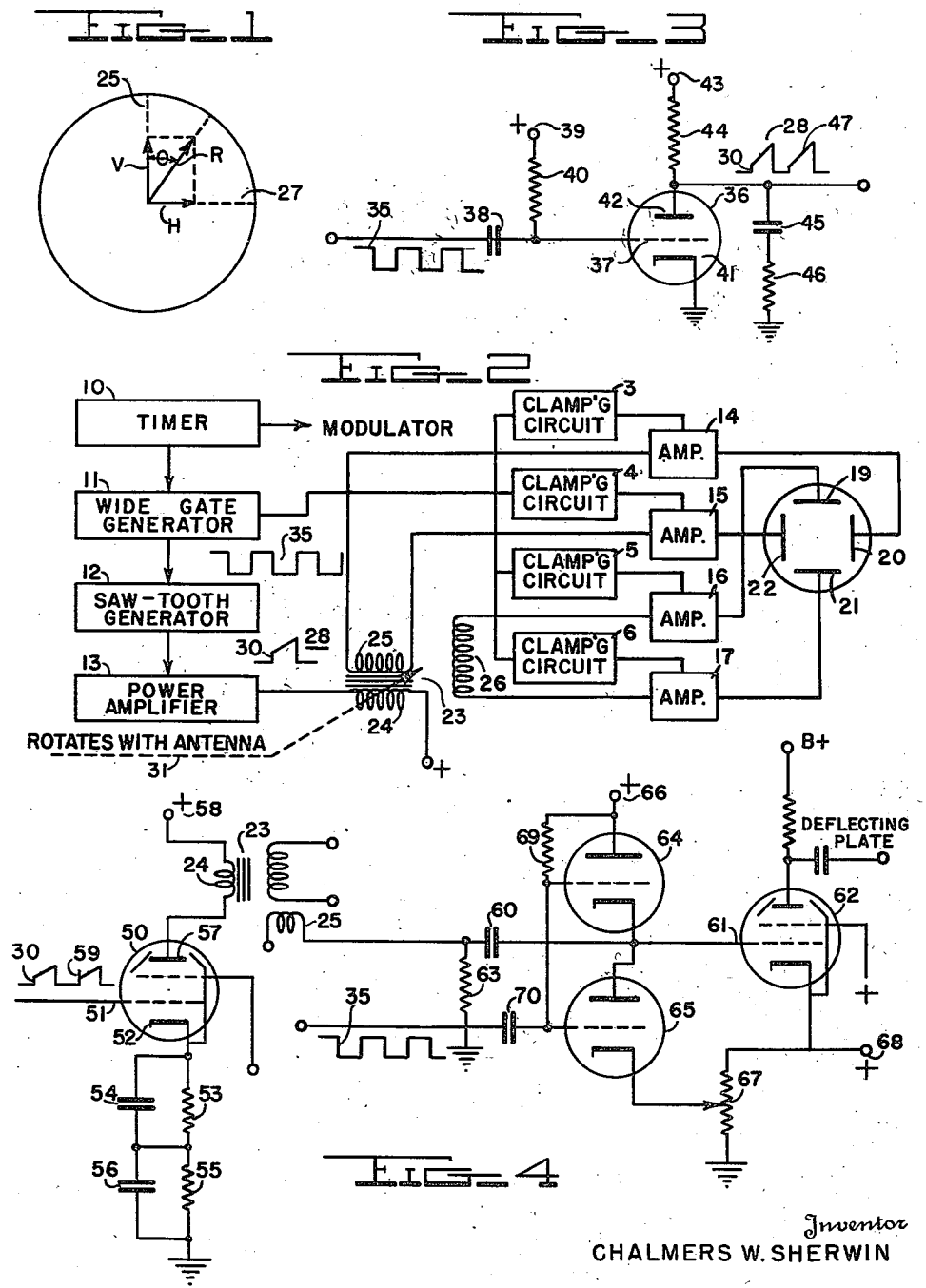

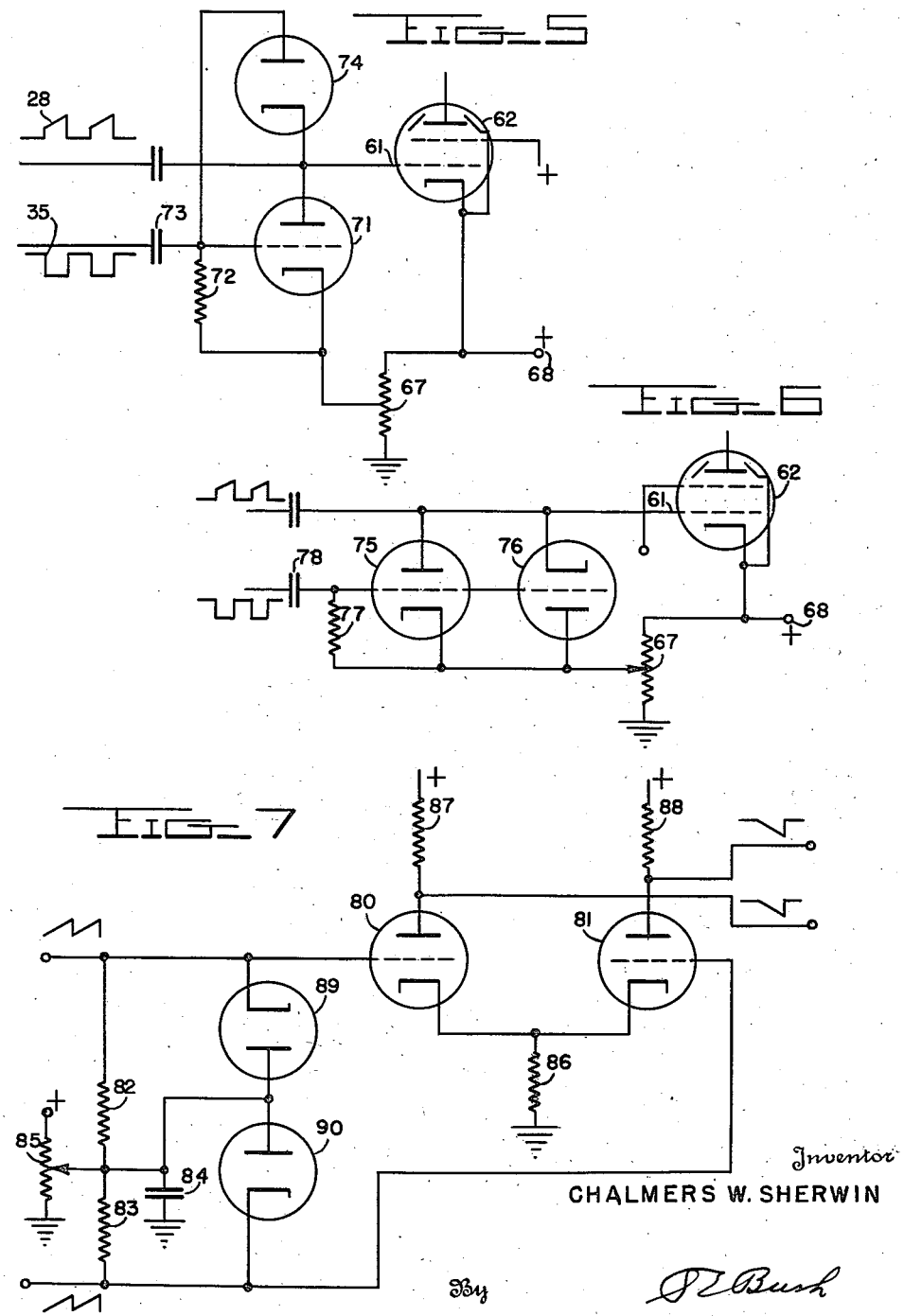

2,578,268

UNITED STATES PATENT OFFICE 2,578,268

VOLTAGE CLAMPING CIRCUIT

Chalmers W. Sherwin, Belmont, Mass., assignor, by mesne assignments, to the United States of America as represented by the Secretary of the Navy Application January 4, 1945, Serial No. 571,316

13 Claims. (Cl. 250—27)

This invention relates, in general, to a means for maintaining a varying signal voltage at some predetermined reference potential during predetermined periods, and in particular to a means for controlling the position of a cathode ray tube beam during the interval between repeated sweeps thereof.

In certain types of radio echo detection apparatus, it is desired to sweep an expanse 360° about the location of the apparatus. In such a system the beam of a cathode ray tube, which generally serves as a range scale, is caused to sweep in a succession of radial lines about the center of the tube. The radial distance from the center of the tube screen to the objects indication (usually an intensified dot) will then represent object range, while the angular position of the instantaneous radial line, which is caused to move synchronously with the rotation of the antenna will therefore correspond to the direction in which the antenna is pointing and hence the bearing of the object relative to a given reference line. The vertical angle of the directional antenna is adjusted as desired and then not changed while the system is operating so that the field is scanned in one coordinate.

It is an object of this invention to provide in a cathode ray tube system which utilizes a repeated radial sweep of the electron beam, a means for accurately centering the beam on the tube screen between successive radial sweeps.

It is another object of this invention to provide a means for maintaining a varying signal voltage at some predetermined reference potential during predetermined periods.

Other objects and features of the present invention will become apparent upon a careful consideration of the following detailed description when taken together with the accompanying drawings:

Figure 1 is a front view of a cathode ray tube showing the manner in which the beam deflection forces operate to produce the desired radial sweep;

Figure 2 is a schematic diagram illustrating one method of obtaining a rotating radial sweep of a cathode ray tube beam;

Figure 3 is a circuit diagram of one type of saw-tooth generator which may be used to force a saw-tooth wave through an inductance;

Figure 4 is a circuit diagram of one embodiment of the invention as applied to the circuit of Figure 2; and, Figures 5, 6, and 7 are circuit diagrams showing modified arrangements of the invention.

Movement of the electron beam of the cathode ray tube along radial lines may be accomplished by providing two forces acting on the beam at right angles to each other, a vector diagram of such forces is indicated in Figure 1. If the solid line H represents the vector of the force tending to move the beam horizontally to the right and the solid line V represents the vector of the force tending to move the electron beam vertically to the top of the tube, then the solid line R will represent the vector resultant of forces H and V. It will be understood that regardless of the angle $\theta$ these vectors will always maintain the relation: $V^2 + H^2 = R^2$. Also it will be evident that if the force R is to be maintained constant as the angle $\theta$ changes, then H must equal R sine $\theta$ and V must always equal R cosine $\theta$. Therefore by varying the forces respectively, with the sine and cosine functions of time, or the angle through which the antenna is rotated, as in the case of a radio echo system, the radial sweep of the cathode ray tube beam can be made to follow the movement of the antenna.

Where an electrostatic cathode ray tube is used, as is shown in Figure 2, it is necessary to provide voltages on the deflecting plates of the cathode ray tube which vary in a predetermined manner. These voltages are preferably substantially linear saw-tooth voltages and are preferably applied in push-pull, so that as a positive saw-tooth voltage is applied to the deflecting plate 19 a negative saw-tooth voltage will be applied to the plate 21, these two voltages being equal in amplitude though opposite in sign. Similar saw-tooth voltages are applied simultaneously to plates 20 and 22, these voltages being likewise equal in amplitude and opposite in sign.

Now in the case of a radio echo detection system with which the invention is described, the voltages applied to the two pairs of deflecting plates is changed in proportion to the movement of the antenna in such a manner that the vector R is always held constant regardless of the angle $\theta$. If we assume that the antenna is pointing straight ahead and that in that direction I want the electron beam to move on the vertical radial line 25 toward the top of the tube, then the saw-tooth voltages applied to the deflecting plates 19 and 21 will have a maximum difference in values, that of plate 19 being positive and that of plate 21 being negative, while the voltages applied to the plates 20 and 22 will have a minimum difference in value, or in other words will be at the same potential.

As the antenna rotates in a clockwise direction, the amplitude difference of the saw-tooth waves applied to the plates 19 and 21 will decrease while the amplitude difference of those applied to the plates 20 and 22 will increase. When the 90° angle is reached the voltage on the plates 20 and 22 will have a maximum difference in amplitude, with plate 20 receiving a positive voltage wave and plate 22 receiving the negative voltage wave, while the deflecting plates 19 and 21 will have zero difference in voltage between them. This will cause the electron beam to follow the horizontal line 27 and move toward the right from the center of the tube. Further rotation of the antenna in a clockwise direction will cause the radial beam sweep of the cathode ray tube to move correspondingly.

One manner of producing these saw-tooth voltage waves and applying them to the plates of the cathode ray tube is illustrated in Figure 2. Here a saw-tooth voltage generator 12 is provided which is connected to the timer 10 through a wide gate generator 11. The timer 10 is arranged to produce a sequence of keying pulses, which are applied both to the modulator (not shown) and the wide gate circuit 11. The latter in turn produces a sequence of negative wide gate pulses 35 which have a time duration arbitrarily chosen to correspond to a suitable range for the system. These negative pulses are fed to the saw-tooth generator 12 which produces, in a manner to be later described, a saw-tooth voltage wave somewhat as indicated at 28, having a steep wave front 30. This saw-tooth voltage is then amplified by the power amplifier 13 and fed to the rotor 24 of a rotary transformer 23.

This device has a rotatable primary winding 24 which is adapted to be rotated about an axis substantially perpendicular to the axes of the winding. The winding 24 is also substantially symmetrical about the axis of rotation. The transformer has two secondary windings 25 and 26 arranged with their axes at right angles to each other, in a plane which is substantially perpendicular to the axis of rotation. The rotary winding 24 may be arranged in any desired manner to be rotated by the rotating mechanism which controls the scanning of the antenna. For purposes of illustration this rotational connection has been indicated by the dotted line 31, and it will be understood that this may be a direct mechanical connection or a connection through synchronous motors to cause the rotor 24 to follow the movement of the antenna, as the latter scans about the vertical axis. The ends of the secondary winding 25 are connected to separate amplifiers 14 and 15, the outputs of which are connected respectively to the deflecting plates 20 and 22, while the ends of the secondary winding 26 are connected to amplifiers 16 and 17, the outputs of which are connected respectively to the vertical deflecting plates 19 and 21.

When the rotor 24 is parallel with the secondary 25, as indicated in the drawing, the plates 20 and 22 will receive the maximum amplitude of the saw-tooth voltage wave. At this time the secondary 26 is at right angles to the rotor 24 and will receive minimum amplitude of the voltage wave. As the rotor 24 rotates, however, the amplitude of the horizontal deflecting plate voltages will decrease in proportion to the sine of the angle of rotation and the amplitude of the voltage on the vertical plates will increase in proportion to the cosine of the angle until the primary 24 is parallel with the secondary 26, at which time the vertical plates will receive a maximum amplitude of the voltage wave and the horizontal plates will receive a minimum amplitude of this wave, since the rotor 24 will be at right angles to the secondary 25.

As aforementioned, it is one of the objects of the present invention to provide apparatus for causing the electron beam to start from the center of the cathode ray tube for each sweep that it makes, but since the various circuits are coupled by transformers or condensers, it is necessary to apply in some manner a direct reference potential which will positively locate the electron beam at the center of the tube when the sweep begins. This reference potential may conveniently be provided by clamping circuits 3, 4, 5 and 6 which are respectively connected to the grids of amplifiers 14, 15, 16 and 17. The clamping circuits are connected to the output of the wide-gate generator 11 and control the level of the direct current voltage of the saw-tooth voltages at a predetermined value during a predetermined interval in response to the output of generator 11, as will hereinafter more fully be explained.

Where it is desired to force a current in the form of a saw-tooth wave through an inductance the wave applied to the inductance must be distorted somewhat to counteract the current induced in the inductance at the inception of the saw-tooth wave. This distorted wave will correspond to wave 28 with a steep front 30 at the leading edge thereof. If the steep front is not provided on the saw-tooth wave, the current in the inductance will lag as the saw-tooth wave starts and will therefore not have a linear rise at the start. A circuit for producing a steep front saw-tooth voltage wave has been indicated in Figure 3.

This saw-tooth generator may comprise a tube 36, which is a simple triode having a grid 37 to which is applied the square wave 35 derived from the wide gate generator 11 through a suitable coupling condenser 38. The tube 36 is biased normally conducting by virtue of a positive potential applied to the grid 37 from a source indicated at 39 through resistance 40. The cathode 41 is connected directly to ground while the plate 42 is provided with a source of positive potential 43 through a load resistance 44. There is also provided with this circuit a serially connected condenser 45 and resistance 46 which in turn is connected in shunt with tube 36 for a purpose which will become apparent hereinafter.

In operation of the circuit, tube 36 is normally conducting and plate 42 is very nearly at ground potential because of the low resistance of the tube at this instant. When grid 37 is driven negative by the leading edges of the square wave pulse, the plate 42 will suddenly rise in potential. Because of the voltage dividing action of resistances 44 and 46 the steep front 30 of the saw-tooth wave 28 will be formed. Thereafter the condenser 45 starts to charge and the plate voltage undergoes a gradual rise to produce the slope 47 on the saw-tooth voltage 28, whereupon the end or trailing edge of the negative pulse 35 drives grid 37 positive again to render tube 36 conducting and thereby provides a path through which condenser 45 may rapidly discharge to produce the abrupt trailing edge of the saw-tooth voltage.

The amplitude of the saw-tooth voltage is directly proportional to the source 43 and hence may be adjusted, as desired, by adjusting the source.

One form of amplifier 13 is illustrated in Figure 4, together with the rotary transformer 23 and one of the succeeding amplifiers, for instance amplifier 14. In the amplifier 13 a beam power tube 50 is shown with a grid 51 upon which is applied the saw-tooth voltage wave 28. The cathode 52 of tube 50 may be biased in any desired manner as by providing a long time constant resistor-condenser combination comprising the shunt connected resistance 53 and condenser 54. A resistor 55 may also be placed in the cathode circuit between the cathode and the resistor 53 shunted by a small condenser 56. The plate 57 is connected to one end of the primary winding 24 of the rotary transformer 23 while the other end of the primary winding is connected to a source of positive potential, indicated at 58.

Because of the capacity in the leads to the rotor of the transformer 23 and in the windings thereof it may be necessary to provide a small voltage pip 59 to the front or leading edge of the saw-tooth voltage in order to charge these capacities. This pip is provided by the small condenser 56 across the resistor 55 which effectively peaks the amplifier response at the steep leading edge 30 of the saw-tooth voltage 28. The saw-tooth voltage induced in the secondary winding 25 is applied through condenser 60 to the grid 61 of a beam power tube 62 which may constitute the amplifier 14. The end of winding 25 is tied to ground through a resistance 63 which resistance is substantially equal to another resistance in a similar amplifier circuit connected to the other end of winding 25, the two resistances functioning to effectively ground the mid-point of the winding 25. One arrangement of the clamping circuits 3 through 6 of Figure 2 for applying a reference potential to provide a centering of the electron beam has been indicated in Figure 4, this reference voltage being applied to the grid 61 of the power tube 62. This arrangement consists of two triode tubes 64 and 65, the cathode of the former and the plate of the latter being connected to the grid 61. The plate of the tube 64 is then given a positive potential of low voltage, as indicated at 66, and the cathode of the tube 65 is given the reference potential at which it is desired to start each saw-tooth wave. This reference potential may be obtained by connecting the cathode of the tube 65 to the arm of a potentiometer 67, the resistance of which is connected between ground and the cathode of the tube 62, the latter cathode being given a low positive bias potential, as indicated at 68. The grids of the two tubes 64 and 65 are connected together and to the source of potential 66 through a resistance 69. These grids are then supplied through a condenser 70 with the negative square pulses 35 from the wide gate circuit 11.

Because of the positive potential on the grids of the tubes 64 and 65, these tubes will normally be capable of conducting, and either will conduct whenever a suitable potential difference appears between its plate and cathode. Since the grid of the tube 65 will begin to draw current whenever its potential rises to the potential of the bias source set by potentiometer 67, it will never greatly exceed this potential, and hence the grids of both tubes 64 and 65 are normally held at the bias potential. If this is so, it makes no difference whether the grid 61 of the tube 62 is positive or negative with respect to the bias potential 67; if it is negative, there will be plate-cathode current in the tube 64, and if it is positive, there will be plate-cathode current in the tube 65, and, in either case, the result will be that the grid 61 will be brought very nearly to the potential of the bias source 67.

The function of the tubes 64 and 65 will take place in the time interval between the saw-tooth pulses. However, it will be seen that the negative square pulses 35 begin as the saw-tooth voltage starts to rise, in the case of a positive saw-tooth wave, or fall in the case of a negative saw-tooth wave, and this negative square pulse swings the voltage on the grids of the tubes 64 and 65 to a value below cutoff, so that these tubes cease conducting as the saw-tooth voltage starts to rise or fall. The potential of the grid 61 of the tube 62 is therefore free to rise or fall in accordance with either a positive or negative saw-tooth applied to it until the trailing edge of the saw-tooth is reached, at which time the trailing edge of the negative pulse is also reached permitting the potentials of the grids of the tubes 64 and 65 to swing positively again to start one or the other of the tubes conducting and bring the grid 61 of the tubes 62 back to the reference potential of the source 67.

In this voltage clamping circuit the time constant of the resistance 69 and the condenser 70 should be greater than the recurrence time of the saw-tooth, in order to maintain the grids of the clamping tubes negative during the time that the clamping effect is not desired. However, it should be noted that, since, in the present use of the clamping circuit, it is necessary to clamp the voltage just before the start of the saw-tooth, only the trailing edge of the negative square pulse applied to the grids of the clamping tubes may occur at any time after the trailing edge of the saw-tooth, as long as the leading edge occurs at the start of the saw-tooth. The resistance 69 should be sufficiently high so that the grid currents of the tubes 64 and 65 will not be large enough to harm the tubes. It will be noted that the potential through the resistance 69 helps pull the potentials of the grids of the tubes 64 and 65 up to the desired reference potential at which time the grid current in the tube 65 stops the further rise in potential. While large currents flow through all of the elements of the two tubes, the square pulse which controls the operation of the circuit like a gate need deliver very little current.

It will be undrestood that there are four power amplifier tubes, each with a pair of clamping triodes for providing the voltages on the four deflecting plates of the cathode ray tube shown in Figure 2.

In Figures 5 and 6 two other clamping circuits are shown for locking the potential of the grid 61 of the tube 62 at any desired reference value between the saw-tooth waves. In Figure 5 a diode tube 74 has its cathode connected to the grid 61, while its plate is connected directly to the grid of a triode tube 71. The plate of this tube 71 is connected directly to the grid 61, while the cathode is given a potential determined by the potentiometer 67. A resistance 72 is connected between the grid of the tube 71 and its cathode, while the square pulse 35 is applied to the grid of the tube 71 through a coupling condenser 73.

In this circuit the time constant of the resistance 72 and the condenser 73 should be long compared to the recurrence frequency for the reason as stated above, and the negative square pulse which forms the gate may either be equal to the time interval of the saw-tooth pulse or may be greater than this interval, as long as the leading edge coincides with the start of the saw-tooth. However, the negative pulse of the gate must go more negative than any part of the signal (which may be either positive or negative) on the grid 61 as otherwise the diode would operate to raise the grid to the potential of the gate pulse.

In this circuit the grid of the tube 71 and the plate of the diode 74 are held between the saw-tooth pulses at the potential of the source 67, because of the grid current in the tube 71. During the negative square pulse both tubes are cut off. The voltage on the grid 61 may then rise or fall under control of the saw-tooth. When the trailing edge of the negative gate pulse reaches the grid of the tube 71, this tube draws grid current, the grid current holding the plate voltage at approximately that of the cathode, as in the preceding case. The plate of the diode tube 74 is also held at this potential, since it is connected to the grid of the tube 71. Any tendency of the grid 61 of the tube 62 to go more negative than the potential of the source 67 will cause current to flow through the diode 74, while if it should tend to go more positive than this potential, current will flow in the plate-cathode circuit of the tube 71. Thus, the potential of the grid 61 is locked to the bias potential as determined by the potentiometer 67. This circuit, however, will draw power from the gate circuit, producing the negative square pulse, because, while the clamping function is taking place, there must be grid current in the tube 71 and this current must be applied from the gate circuit.

In Figure 6 a modification of the arrangement shown in Figure 4 is disclosed, in that two triode tubes 75 and 76 are used, with the plate of the tube 75 and the cathode of the tube 76 connected to the grid 61 of the tube 62. However, the cathode of the tube 75 and the plate of the tube 76 are connected to the potentiometer 67 for the reference potential, these tube elements also being connected through a resistor 77 to the grids of the tubes 75 and 76 which grids will receive the square gate pulses through the condenser 78.

In this circuit also the time constant of the resistance 77 and the condenser 78 should be larger than the recurrence rate of the square pulses. This circuit also depends on the flow of grid current, which current must be furnished from the gate circuit. It operates similarly to the circuit of Figure 5, maintaining the grid 61 of the tube 62 at the reference potential of the source 67 between the saw-tooth pulses.

It will be understood that the clamping circuits shown in Figures 4, 5, and 6, are not limited to use with the particular saw-tooth waves disclosed. They may be used wherever it is desired to lock a varying signal voltage at some predetermined reference potential during predetermined periods which will be determined by the time duration between the negative square pulses delivered to the grids of the clamping tubes. In some cases the reference potential itself may be varied also as desired, or the signal may be applied in place of the reference potential, in which case selected portions of the signal will determine the potentials of the power tube grids at selected time intervals. The clamping circuit may be connected to any part of the main circuit, but is essential only where the reference potential is lost in some manner, as by passing through a condenser or transformer.

Where the signal is always positive as is the case in certain types of rotary condenser modulators as described in my copending application entitled "Cathode Ray Tube Sweep Circuits," filed January 4, 1945, Ser. No. 571,317, now Patent No. 2,563,967, then the circuit of Figure 7 may be used to lock the beam at the center of the cathode ray tube between repeated radial sweeps. This circuit includes a differential amplifier consisting of tubes 80 and 81, which are adapted to amplify the difference in potential applied to their grids and to apply the amplified difference in push-pull to the deflecting plates of an electrostatic deflection type of cathode ray tubes. Across the grid circuits of these two tubes is a pair of substantially equal serially connected resistances 82 and 83, the former being connected to the grid of tube 80 and the latter connected to the grid of tube 81. The juncture of these two resistances is connected through condenser 84 to ground and also to the arm of potentiometer 85, the resistance of which is connected between ground and a source of positive potential. The cathodes of tubes 80 and 81 are connected together and through a resistance 86 to ground, while the plates are connected to a suitable source of positive potential through load resistances 87 and 88, respectively. The plates of the tubes 80 and 81 are connected for instance directly to the horizontal deflecting plates of the cathode ray tube.

If the potential of the grid of the tube 80 is increased with respect to the potential of its cathode by a signal, the cathodes of both tubes will rise in potential because of the plate-cathode current through the cathode resistance 86. If no signal is applied to the grid of the tube 81, then the plate current through this tube will decrease, because of the increase of the cathode potential of this tube caused by the signal. However, in this case a signal is applied to the grid of the tube 81 which is either less than that applied to the grid of the tube 80, greater than that signal, or equal to it. The effect is to amplify the difference in the signals delivered to the two grids; if that applied to the grid of the tube 80 is greater than that applied to the grid of the tube 81, a large negative signal will appear on the plate of the tube 80, while a small positive signal will appear on the plate of the tube 81. Conversely, if the positive signal on the grid of the tube 81 is greater than that on the grid of the tube 80, the negative signal on the plate of the tube 81 will be greater in amplitude than the positive signal on the plate of the tube 80. If, on the other hand, the positive signals on the grids of the tubes are equal, then there will be substantially equal signals on the plates of the tubes 80 and 81, as indicated.

It is necessary, however, to tie the grids of the tubes 80 and 81 to some definite direct current potential to insure the electron beam of the cathode ray tube always being at the center when the signals on the plates of the tubes 80 and 81 are equal, so that the sweep will start from the center, and this may be done by means of the diodes 89 and 90. The cathode of the diode 89 is connected to the grid of the tube 80 while its plate is connected to the juncture of the resistances 82 and 83. In a similar manner the cathode of the diode 90 is connected to the grid of the tube 81 and its plate is connected to the juncture of the resistances 82 and 83. With these diodes 89 and 90 connected as shown, the grids of the tubes 80 and 81 can never become more negative than the mid-point of the resistors 82 and 83, the potential of which point is determined by the setting of the potentiometer 85.

It will be understood from the description of the various figures and the disclosure therein that I have provided, in particular, a means for centering, between sweeps, the electron beam of a cathode ray tube sweep system, which utilizes a rotating radial sweep.

Various modifications of the invention besides those shown and described may be used without departing from the spirit thereof, therefore I do not desire to limit my invention except insofar as it is limited by the appended claims.

What is claimed is:

1. A voltage clamping circuit to cause the potential of a circuit carrying a varying voltage wave to return to a predetermined reference voltage during predetermined intervals of time, which comprises in combination, a first thermionic tube having at least a plate, a cathode and a control grid, a source of reference potential, means to connect the plate of first said tube to a circuit carrying a varying voltage, means to connect the cathode of said first tube to said source of reference voltage, a second tube having at least a plate, a control grid, and a cathode, means to connect the cathode of said second tube to said circuit, a source of positive potential, means to connect said plate of said second tube to said source of positive potential, means to connect the control grids of both of said tubes together, a resistance connected between said source of positive potential and said control grids, said resistance having such a value as normally to maintain grid current but not excessive grid current in said first tube, and means to apply negative pulses to the grids of said tubes having predetermined time durations so as to cause both of said tubes to cut off during such periods of time.

2. A voltage clamping circuit to cause the potential of a circuit carrying a varying voltage wave to return to a predetermined reference voltage for predetermined time intervals which comprises, in combination, a first vacuum tube having at least a plate, a control grid and a cathode, a second vacuum tube having at least a plate, a control grid, and a cathode, means connecting the cathode of said first tube and the plate of said second tube to the circuit to be clamped, a source of reference voltage, means to connect the plate of said first tube and the cathode of said second tube to said source of reference voltage, means to connect the control grids of said tubes together, a resistance connected between said control grids and said source of reference voltage, means to apply a succession of negative pulses to the grids of said tubes whereby said tubes are cut-off for predetermined time intervals, and a condenser in said grid circuit, the time constant of said condenser and said resistance being greater than the recurrence frequency of said negative pulses.

3. A voltage clamping circuit to cause the potential of a circuit carrying a varying voltage wave to return to a predetermined reference voltage for predetermined time intervals which comprises, in combination, a first vacuum tube having at least a plate, a control grid and a cathode, a second vacuum tube also having a plate, a control grid and a cathode, means connecting the cathode of said first tube and the plate of said second tube to the circuit to be clamped, a source of reference voltage, means to connect the plate of said first tube and the cathode of said second tube to said source of reference voltage, means to connect the control grids of said tubes together, means for maintaining a bias on said grids substantially equal to said reference voltage, and means to apply a succession of negative pulses to said grids, whereby said tubes are driven to cut-off for predetermined time intervals.

4. In a rotating radial sweep system for cathode ray oscillography wherein a sinusoidally modulated saw-tooth voltage wave of one sense is applied to the deflecting means of said tube through a differential amplifier which consists of a pair of vacuum tubes each having at least an anode, a cathode and a control grid; a means for locking the bias on the control grids of said differential amplifier at a desired bias, comprising a pair of diode type vacuum tubes, means connecting their plates together and to a source of bias voltage and means connecting the cathode of each of said diodes to the respective grids of said differential amplifier.

5. In a circuit for causing successive sweeps of a radially scanned plan position indicator to start at the center of a cathode ray tube, the combination of a first tube having a control grid and a cathode, a source of spaced sawtooth voltage pulses, means applying said spaced sawtooth voltage pulses to the control grid of said first tube, and means for returning the grid of said first tube to a predetermined positive potential between said sawtooth voltage pulses which comprises a second tube having at least a plate, a control grid and a cathode, a voltage source of said predetermined positive potential, means connecting the plate of said second tube to the grid of said first tube, means connecting the cathode of said second tube to said voltage source, means for holding said second tube nonconducting during said sawtooth voltage pulses, said second tube being so biased that it is rendered conducting by said last-mentioned means during the periods between successive sawtooth voltage pulses, the conduction of said second tube being sufficient to cause the potential of the plate thereof and consequently the grid of said first tube to equal said reference potential, a third tube having at least a plate and cathode, means connecting the cathode of said third tube to the grid of said first tube, and means for biasing said third tube to permit it to conduct simultaneously with said second tube when the potential of the grid of said first tends to fall below said predetermined potential.

6. A voltage clamping circuit for causing the potential of a circuit carrying a first series of spaced voltage pulses to return to a predetermined positive potential during the intervals of time between said voltage pulses, which comprises, in combination, a first thermionic tube having at least a plate, a control grid and cathode, a voltage source of said predetermined positive potential, means connecting the plate of said first tube to said circuit carrying said first series of voltage pulses, means connecting the cathode of said tube to said source of reference potential, a source of pulses for producing a second series of spaced negative rectangular pulses whose leading edges coincide with the leading edges of said first series of pulses and of a duration at least as great as the duration of the pulses in said first series, means applying said second series of pulses to the control grid of said first tube, the magnitude of said pulses being sufficient to cut off said first tube during the occurrence of the pulses in said first series, said first tube being biased to conduct at substantially its maximum conductivity following the trailing edges of the corresponding negative pulses of said second series whereby the potential of the plate of said first tube for a period immediately preceding each of said positive pulses is at substantially said reference potential, a second electron tube having at least a plate and a cathode, means connecting the cathode of said second tube to the circuit carrying said first series of pulses, and means for biasing said second tube to permit it to conduct simultaneously with the time of maximum conduction of said first tube when the potential of said circuit tends to fall below said predetermined potential.

7. In a circuit for causing successive sweeps of a radially scanned plan position indicator to start at the center of a cathode ray tube, the combination of a first tube having at least a control grid, a source of spaced sawtooth voltage pulses, means applying said spaced sawtooth voltage pulses to the control grid of said first tube, and means for returning the control grid of said first tube to a predetermined positive potential between said sawtooth voltage pulses which comprises, a second tube having at least a plate, a control grid and a cathode, a voltage source of said predetermined positive potential, means connecting the plate of said second tube to the grid of said first tube, means connecting the cathode of said second tube to said voltage source, a resistor connected between the grid and cathode of said second tube, a third tube having at least a plate, a cathode and a control grid, the cathode of said third tube being connected to the grid of said first tube, the plate of said third tube being connected to said source of reference potential, and the grid of said third tube being connected to the grid of said second tube, and means for generating a series of spaced negative pulses whose leading edges coincide with the leading edges of said sawtooth voltage pulses and of a duration at least as great as the duration of said sawtooth voltage pulses, said negative pulses being applied to the control grids of said second and third tubes, said negative pulses being of sufficient magnitude to cut off said second and third tubes during the occurrence of said sawtooth voltages, said second tube being rendered heavily conductive following the trailing edges of said negative pulses whereby the plate of said first tube for a period immediately preceding each sawtooth voltage pulse is at substantially said reference potential, said third tube being capable of conducting simultaneously with said second tube when the potential of the grid of said first tube tends to fall below said reference potential.

8. In a circuit for causing successive sweeps of a radially scanned plan position indicator to start at the center of a cathode ray tube, the combination of a first tube having at least a control grid, a source of spaced sawtooth voltage pulses, means applying said sawtooth voltage pulses to the control grid of said first tube, and means for returning the control grid of said first tube to a predetermined positive potential between said sawtooth voltage pulses which comprises second and third tubes each having at least a plate, a cathode and a control grid, a voltage source of said predetermined positive potential, means connecting the cathode of said second tube and the plate of said third tube to said voltage source, means connecting the plate of said second tube and the cathode of said third tube to the control grid of said first tube, means connecting the grid of said second and third tubes together, a resistance connected between the control grids of said second and third tubes to said source of positive potential, means for applying a succession of negative pulses to the grids of said second and third tubes whereby said tubes are cut off during the occurrence of said sawtooth voltage pulses and conducting during the intervals between said sawtooth voltage pulses, the flow of grid current in said second and third tubes during the periods of conduction thereof maintaining the plate and cathode respectively of said second and third tubes at said positive potential.

9. In a circuit for causing successive sweeps of a radially scanned plan position indicator to start at the center of a cathode ray tube, the combination of a first tube having at least a control grid, means applying a series of spaced sawtooth voltage pulses to the control grid of said first tube, and means for returning the control grid of said first tube to a predetermined positive reference potential between said sawtooth voltage pulses which comprises second and third tubes each having at least a plate, a cathode and a control grid, a voltage source of said predetermined positive potential, means connecting the plate of said second tube and the cathode of said third tube to the grid of said first tube, means connecting the cathode of said second tube and the plate of said third tube to said voltage source, means connecting the grids of said second and third tubes together, a resistance connected between the control grids of said second and third tubes and said source of positive potential, means for applying a succession of negative pulses to the grids of said second and third tubes of sufficient magnitude to cut said tube off during the occurrence of said sawtooth voltage pulses and conducting during the intervals between said sawtooth voltage pulses, and a condenser in the grid circuit of said second and third tubes, the time constant of said condenser and said resistance being greater than the period of said negative pulses, the flow of grid current in said second and third tubes maintaining the plate and cathode, respectively, of said second and third tubes at said positive potential.

10. In a circuit for causing successive sweeps of a radially scanned plan position indicator to start at the center of a cathode ray tube, the combination of a first tube having at least a conrol grid, means applying a series of spaced sawtooth voltage pulses to the control grid of said first tube, and means for returning the control grid of said first tube to a predetermined positive reference potential between said sawtooth voltage pulses which comprises second and third tubes each having at least a plate, a cathode and a control grid, a first voltage source of said predetermined positive potential, means connecting the plate of said second tube to the grid of said first tube, means connecting the plate of said second tube to the grid of said first tube, means connecting the cathode of said second tube to said source of positive potential, means connecting the cathode of said third tube to the grid of said first tube, a second source of positive potential, means connecting the control grids of said second and third tubes together, a resistance connected between said second source of positive potential and the control grids of said second and third tubes, means for applying a succession of negative pulses to the grids of said second and third tubes of sufficient magnitude to cut said tubes off during the occurrence of said sawtooth voltage pulses and to render them conducting during the intervals between said sawtooth voltage pulses, said resistance having such a value as normally to maintain grid current in said second and third tubes but not excessive grid current in said second tube, the said flow of grid current in said second and third tubes maintaining the plate and cathode, respectively, of said second and third tubes at said positive reference potential.

11. In a circuit for causing successive sweeps of a radially scanned plan position indicator to start at the center of a cathode ray tube, the combination of a first tube having at least a control grid, means applying a series of spaced sawtooth voltage pulses to the control grid of said first tube, and means for returning the control grid of said first tube to a predetermined positive reference potential between said sawtooth voltage pulses which comprises second and third tubes each having at least a plate, a cathode, and a control grid, a voltage source of said predetermined positive potential, means connecting the plate of said second tube to the grid of said first tube, means connecting the cathode of said second tube to said source of reference potential, means connecting the cathode of said third tube to the grid of said first tube, means connecting the grids of said second and third tubes together, means for applying a succession of negative pulses to the grids of said second and third tubes of sufficient magnitude to cut off said tubes during the occurrence of said sawtooth voltage pulses and to render them conducting during the intervals between said sawtooth voltage pulses, and means for biasing said second and third tubes such that grid current normally flows in said second and third tubes during the conduction thereof whereby the plate and cathode respectively of said second and third tubes and consequently the grid of said first tube is maintained at said reference potential.

12. In a circuit for causing successive sweeps of a radially scanner plan position indicator to start at the center of a cathode ray tube, the combination of a first tube having at least a control grid, means applying a series of spaced sawtooth voltage pulses to the control grid of said first tube, and means for returning the control grid of said first tube to a predetermined positive reference potential between said sawtooth voltage pulses which comprises a second tube having at least a control grid, a plate and a cathode, a third tube having a plate and a cathode, a voltage source of said reference potential, means connecting the plate of said second tube to the grid of said first tube, means connecting the cathode of said third tube to the grid of said first tube, means connecting the plate of said third tube to the grid of said second tube, means connecting the cathode of said second tube to said source of reference potential, means for applying a succession of negative pulses to the grid of said second tube and the plate of said third tube of sufficient magnitude to cut off said tubes during the occurrence of said sawtooth voltage pulses and to render them both conducting during the intervals between said sawtooth voltage pulses, and means biasing said second tube such that grid current flows therein during the period of conduction thereof, the aforesaid connections maintaining the grid of said first tube at said reference potential during periods of conduction of said second and third tubes.

13. The invention defined in claim 12 wherein said biasing means comprising a resistance connected between the grid of said second tube and said source of positive reference potential.

CHALMERS W. SHERWIN.

REFERENCES CITED

The following references are of record in the file of this patent:

UNITED STATES PATENTS

| Number | Name | Date |
|---|---|---|
| 2,298,809 | Rhea | Oct. 13, 1942 |
| 2,299,944 | Wendt | Oct. 27, 1942 |
| 2,335,265 | Dodington | Nov. 30, 1943 |